US010049311B2

(12) United States Patent
Kuwaki et al.

(10) Patent No.: US 10,049,311 B2
(45) Date of Patent: Aug. 14, 2018

(54) CARD READER AND CARD LOCK MECHANISM

(71) Applicant: NIDEC SANKYO CORPORATION, Suwa-gun, Nagano (JP)

(72) Inventors: Hirofumi Kuwaki, Nagano (JP); Hiroshige Takeda, Nagano (JP); Shinya Miyazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 69 days.

(21) Appl. No.: 15/171,245

(22) Filed: Jun. 2, 2016

(65) Prior Publication Data
US 2016/0358044 A1 Dec. 8, 2016

(30) Foreign Application Priority Data

Jun. 3, 2015 (JP) ................................. 2015-112756

(51) Int. Cl.
*G06K 13/08* (2006.01)
*G06K 13/07* (2006.01)
*G06K 13/06* (2006.01)
*G06K 7/00* (2006.01)
*G06K 7/08* (2006.01)

(52) U.S. Cl.
CPC ....... *G06K 13/0862* (2013.01); *G06K 7/0056* (2013.01); *G06K 7/082* (2013.01); *G06K 2207/1016* (2013.01)

(58) Field of Classification Search
CPC .... G06K 13/06; G06K 13/067; G06K 13/077; G06K 13/08; G06K 13/0843; G06K 13/085; G06K 13/0862; G06K 13/0868; G06K 7/0069; B65H 2701/1914
USPC .......................... 235/475, 477, 479, 486, 380
See application file for complete search history.

(56) References Cited

U.S. PATENT DOCUMENTS

| 5,039,849 A * | 8/1991 | Tano ...................... G06K 13/08 |
| | | 235/475 |
| 9,659,240 B2 * | 5/2017 | Miyazawa ........... G06K 13/085 |
| 2006/0086793 A1* | 4/2006 | Oguchi .................. G06K 13/08 |
| | | 235/441 |
| 2010/0038429 A1* | 2/2010 | Orii ...................... G06K 7/0021 |
| | | 235/483 |
| 2016/0232384 A1* | 8/2016 | Watanabe ............ G06K 7/0069 |

FOREIGN PATENT DOCUMENTS

| EP | 1630725 A1 * | 3/2006 | ............. G06K 13/08 |
| JP | 2006155567 A | 6/2006 | |
| JP | WO 2015064124 A1 * | 5/2015 | ........... G06K 7/0069 |

* cited by examiner

*Primary Examiner* — Suezu Ellis
(74) *Attorney, Agent, or Firm* — Cantor Colburn LLP

(57) ABSTRACT

A card reader may include a card insertion port; a card conveying passage; and a card lock mechanism structured to prevent drawing of the card from the card insertion port. The card lock mechanism may include a motor; a lock member comprising a prevention pawl structured to move between a contact position and a retreated position; and a power transmission mechanism structured to transmit power of the motor to the lock member. The power transmission mechanism may include a final gear which is disposed on a most lock member side in a transmitting direction of power from the motor to the lock member. The lock member may include a sector gear which is engaged with the final gear.

21 Claims, 8 Drawing Sheets

Fig. 10
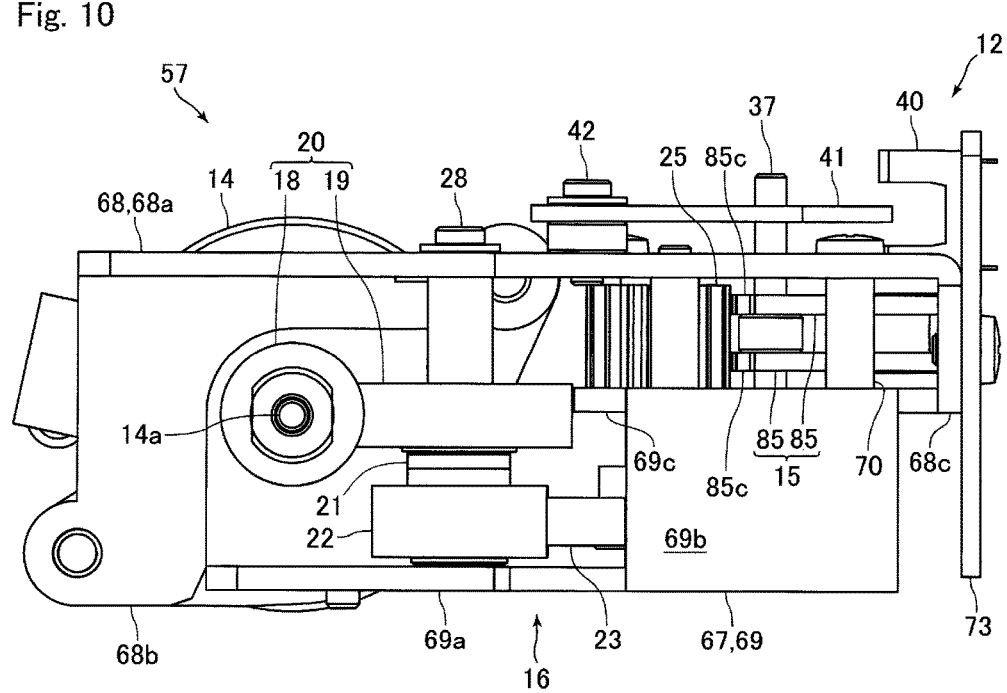
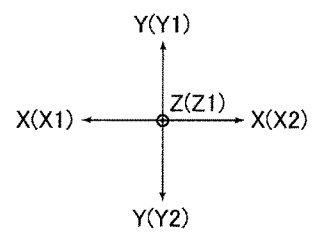

CARD READER AND CARD LOCK MECHANISM

CROSS REFERENCE TO RELATED APPLICATION

The present invention claims priority under 35 U.S.C. § 119 to Japanese Application No. 2015-112756 filed Jun. 3, 2015, the entire content of which is incorporated herein by reference.

FIELD OF THE INVENTION

At least an embodiment of the present invention may relate to a card reader structured to read data recorded in a card and record data in a card. Further, at least an embodiment of the present invention may relate to a card lock mechanism which is mounted and used in the card reader.

BACKGROUND

Conventionally, a card reader has been widely utilized which is structured to read data recorded in a card and record data in a card. In an industry such as a financial institution where a card reader is utilized, illegal acquisition of a card by a criminal who intentionally clogs the card in an inside of a card reader, i.e., so-called phishing has become a large issue. Therefore, conventionally, a card reader having a card lock mechanism for preventing phishing has been proposed (see, for example, Japanese Patent Laid-Open No. 2006-155567).

In the card reader described in the above-mentioned Patent Literature, the card lock mechanism includes a lock lever for preventing drawing of a card from a card insertion port. The lock lever is provided with lock teeth in a substantially triangular shape which is configured to contact with a card for preventing drawing of the card. The lock lever is turnably supported by a support pin. Further, the lock lever is connected with a motor through a connecting lever, a fan-shaped gear and a reduction gear train. The connecting lever is formed in a flat plate shape. One end side of the connecting lever is turnably attached to the lock lever and the other end side of the connecting lever is turnably attached to the fan-shaped gear. Further, the fan-shaped gear is engaged with a final gear of the reduction gear train. The lock lever is turnable between a position where the lock teeth are retreated from a card conveying passage and a position where the lock teeth are contacted with the card by power of the motor.

In the card reader described in the above-mentioned Patent Literature, when a card is abnormally stopped and the card is clogged in the card conveying passage, the card lock mechanism is operated and the lock teeth retreated from the card conveying passage are contacted with the card. In a state that the lock teeth are contacted with a card, the lock teeth are inclined to a rear side of the card reader as going toward the card. Therefore, when a card is to be drawn out from the card insertion port, the lock teeth stick into the card and thereby drawing of the card from the card insertion port is prevented.

In the card reader described in the above-mentioned Patent Literature, the lock lever and the fan-shaped gear are connected with each other through the connecting lever. Therefore, rattling may occur in a connecting portion of the lock lever with the connecting lever and in a connecting portion of the connecting lever with the fan-shaped gear. Further, the connecting lever is formed in a flat plate shape and thus, when a large load is applied to the connecting lever, the connecting lever may be deformed. According to examinations of the present inventors, in the card reader described in the above-mentioned Patent Literature, when rattling occurs in a connecting portion of the lock lever with the connecting lever and in a connecting portion of the connecting lever with the fan-shaped gear or, when the connecting lever is deformed, the lock teeth may be disengaged from the card in a state that drawing is prevented by the lock teeth contacted with the card and the card is drawn out even when the motor is stopped.

SUMMARY

In view of the problem described above, at least an embodiment of the present invention may advantageously provide a card reader and a card lock mechanism which are capable of preventing the prevention pawl for preventing drawing of a card from disengaging from the card in a state that drawing is prevented by the prevention pawl contacted with the card.

According to at least an embodiment of the present invention, there may be provided a card reader including a card insertion port into which a card is inserted and from which the card is ejected, a card conveying passage where the card inserted from the card insertion port is conveyed, and a card lock mechanism structured to prevent drawing of the card from the card insertion port when the card is abnormally stopped in the card conveying passage and the card is clogged in the card conveying passage. The card lock mechanism includes a motor, a lock member which is formed with a prevention pawl configured to contact with the card for preventing drawing of the card and is moved between a contact position where the prevention pawl is contacted with the card and a retreated position where the prevention pawl is retreated from the card conveying passage by power transmitted from the motor, and a power transmission mechanism structured to transmit power of the motor to the lock member. The power transmission mechanism includes a final gear which is disposed on a side closest to the lock member in a transmitting direction of power from the motor to the lock member, and the lock member is formed with a sector gear which is engaged with the final gear.

In the card reader in at least an embodiment of the present invention, a sector gear engaged with the final gear of the power transmission mechanism is formed in the lock member in which the prevention pawl configured to prevent drawing of a card by contacting with the card is formed. In other words, in at least an embodiment of the present invention, the prevention pawl and the sector gear are integrally formed with each other. Therefore, according to at least an embodiment of the present invention, rattling does not occur in a connecting portion of the lock lever with the connecting lever and in a connecting portion of the connecting lever with the fan-shaped gear and, in addition, the connecting lever is not deformed like the card reader described in the above-mentioned Patent Literature. Accordingly, in the present invention, the prevention pawl is prevented from disengaging from a card in a state that drawing is prevented by the prevention pawl contacted with the card.

In at least an embodiment of the present invention, the power transmission mechanism includes a worm gear structured of a screw gear fixed to an output shaft of the motor and a helical gear engaged with the screw gear, a first rotation shaft to which the helical gear is fixed, a first gear which is fixed to the first rotation shaft, a second gear to which power from the first gear is transmitted, a second rotation shaft which is disposed in parallel to the first rotation shaft and by which the second gear is relatively turnably held, the final gear which is fixed to the second rotation shaft, two gear side pins which are fixed to a side face of the second gear so as to protrude in an axial direction of the second rotation shaft, and a shaft side pin which is fixed to the second rotation shaft so as to protrude to both sides in a radial direction of the second rotation shaft and to be capable of contacting with the two gear side pins. A pin clutch is structured of the two gear side pins and the shaft side pin, the motor is disposed so that a thickness direction of the card conveyed along the card conveying passage and an axial direction of the output shaft are parallel to each other, and the first rotation shaft and the second rotation shaft are disposed so that a width direction of the card perpendicular to a conveying direction of the card conveyed along the card conveying passage and a thickness direction of the card is parallel to axial directions of the first rotation shaft and the second rotation shaft. The card lock mechanism includes a fixed shaft turnably holding the lock member or a turnable shaft turning together with the lock member, and the lock member is turned with the fixed shaft or the turnable shaft as a center and is moved between the contact position and the retreated position.

Reduction efficiency of a worm gear is high and thus, according to this structure, contact pressure of the prevention pawl with a card can be sufficiently secured. Further, according to this structure, when drawing force is applied to a card, the prevention pawl is moved in the drawing direction together with the card by operation of the pin clutch and thus the prevention pawl is further pressed against a surface of the card or stuck into the card. In addition, according to this structure, the power transmission mechanism can be shortened by the worm gear, and the output shaft of the motor and the first rotation shaft and the second rotation shaft are arranged in a perpendicular relationship and thus the size of the power transmission mechanism can be reduced. Therefore, the worm gear, the gears and the pin clutch are arranged in a compact manner and thus a small card lock mechanism can be realized which is structured to prevent the prevention pawl from disengaging from a card.

In at least an embodiment of the present invention, the second rotation shaft is disposed between one end of the motor and the other end of the motor in the thickness direction of the card. According to this structure, the size of the card lock mechanism can be reduced in the thickness direction of a card.

In at least an embodiment of the present invention, the first gear and the second gear are disposed on one side in the width direction of the card relative to the helical gear, the final gear and the lock member are disposed on the other side in the width direction of the card relative to the helical gear, and the output shaft, the first rotation shaft, the second rotation shaft and the fixed shaft or the turnable shaft are disposed in this order in the conveying direction of the card. According to this structure, structural components of the card lock mechanism can be disposed with the motor as a center in the width direction of a card and the structural components of the card lock mechanism can be arranged in the conveying direction of a card. Therefore, the size of the card lock mechanism can be reduced in the width direction of a card.

In at least an embodiment of the present invention, when one side in the width direction of the card is referred to as a first direction and the other side in the width direction of the card is referred to as a second direction, the helical gear is disposed on a first direction side relative to the first gear, the gear side pins are fixed to a side face on a second direction side of the second gear so as to protrude in the second direction, and the shaft side pin, the final gear and the lock member are disposed on a second direction side relative to the second gear. According to this structure, structural components of the card lock mechanism can be arranged in the width direction of a card and thus the size of the card lock mechanism can be reduced in the conveying direction of the card.

In at least an embodiment of the present invention, when one side in the thickness direction of the card is referred to as a third direction and the other side in the thickness direction of the card is referred to as a fourth direction, the motor is disposed so that the output shaft is protruded to a third direction side, and the prevention pawl is moved to a fourth direction side when the lock member is moved from the retreated position to the contact position.

In at least an embodiment of the present invention, the card lock mechanism includes a first side plate in a flat plate shape which structures one side face of the card lock mechanism in a width direction of the card which is perpendicular to a conveying direction of the card conveyed along the card conveying passage and a thickness direction of the card, and a second side plate in a flat plate shape which structures the other side face of the card lock mechanism in the width direction of the card, and the lock member and the power transmission mechanism are disposed between the first side plate and the second side plate in the width direction of the card. According to this structure, for example, the lock member and the power transmission mechanism are arranged on the first side plate with the first side plate as a reference and, after that, the second side plate is attached and, in this manner, the card lock mechanism can be assembled. Therefore, the card lock mechanism can be assembled easily.

In at least an embodiment of the present invention, the card lock mechanism includes an optical sensor having a light emitting element and a light receiving element for receiving light from the light emitting element, and an intercept member which is moved together with the lock member and intercepts light from the light emitting element to the light receiving element when the lock member is located at the retreated position. According to this structure, it can be detected that the lock member is located at a retreated position by using the optical sensor and the intercept member.

In at least an embodiment of the present invention, the card lock mechanism includes a support frame to which the motor, the lock member and the power transmission mechanism are attached, a side face of the support frame in the width direction of the card, which is perpendicular to a conveying direction of the card conveyed along the card conveying passage and a thickness direction of the card, is formed with an engaging groove in a slit shape whose longitudinal direction is the thickness direction of the card, and a main body frame of the card reader is formed with an engaging wall part with which the engaging groove is engaged. According to this structure, when a card in a state that drawing is prevented by the prevention pawl contacted with the card is drawn from the card insertion port by a criminal, the card lock mechanism is prevented from disengaging from the main body frame by the engaging groove formed in the support frame and the engaging wall part formed in the main body frame.

Further, according to at least an embodiment of the present invention, there may be provided a card lock mechanism for use in a card reader having a card insertion port into which a card is inserted and from which the card is ejected and a card conveying passage where the card inserted from the card insertion port is conveyed, and the card lock mechanism is structured to prevent drawing of the card from the card insertion port when the card is abnormally stopped in the card conveying passage and the card is clogged in the card conveying passage. The card lock mechanism includes a motor, a lock member which is formed with a prevention pawl configured to contact with the card for preventing drawing of the card and is moved between a contact position where the prevention pawl is contacted with the card and a retreated position where the prevention pawl is retreated from the card conveying passage by power transmitted from the motor, and a power transmission mechanism structured to transmit power of the motor to the lock member. The power transmission mechanism includes a final gear which is disposed on a side closest to the lock member in a transmitting direction of power from the motor to the lock member, and the lock member is formed with a sector gear which is engaged with the final gear.

In the card lock mechanism in at least an embodiment of the present invention, a sector gear engaged with the final gear of the power transmission mechanism is formed in the lock member in which the prevention pawl configured to prevent drawing of a card by contacting with the card is formed. Therefore, according to at least an embodiment of the present invention, rattling does not occur in a connecting portion of the lock lever with a connecting lever and in a connecting portion of the connecting lever with a fan-shaped gear and the connecting lever is not deformed like the card reader described in the above-mentioned Patent Literature. Accordingly, in at least an embodiment of the present invention, the prevention pawl is prevented from disengaging from a card in a state that drawing is prevented by the prevention pawl contacted with the card.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10 is a plan view showing a state that a knob is detached from the card lock mechanism in FIG. 7.

DETAILED DESCRIPTION

Embodiments of the present invention will be described below with reference to the accompanying drawings.
[First Embodiment]
(Schematic Structure of Card Reader)

Figure 1:
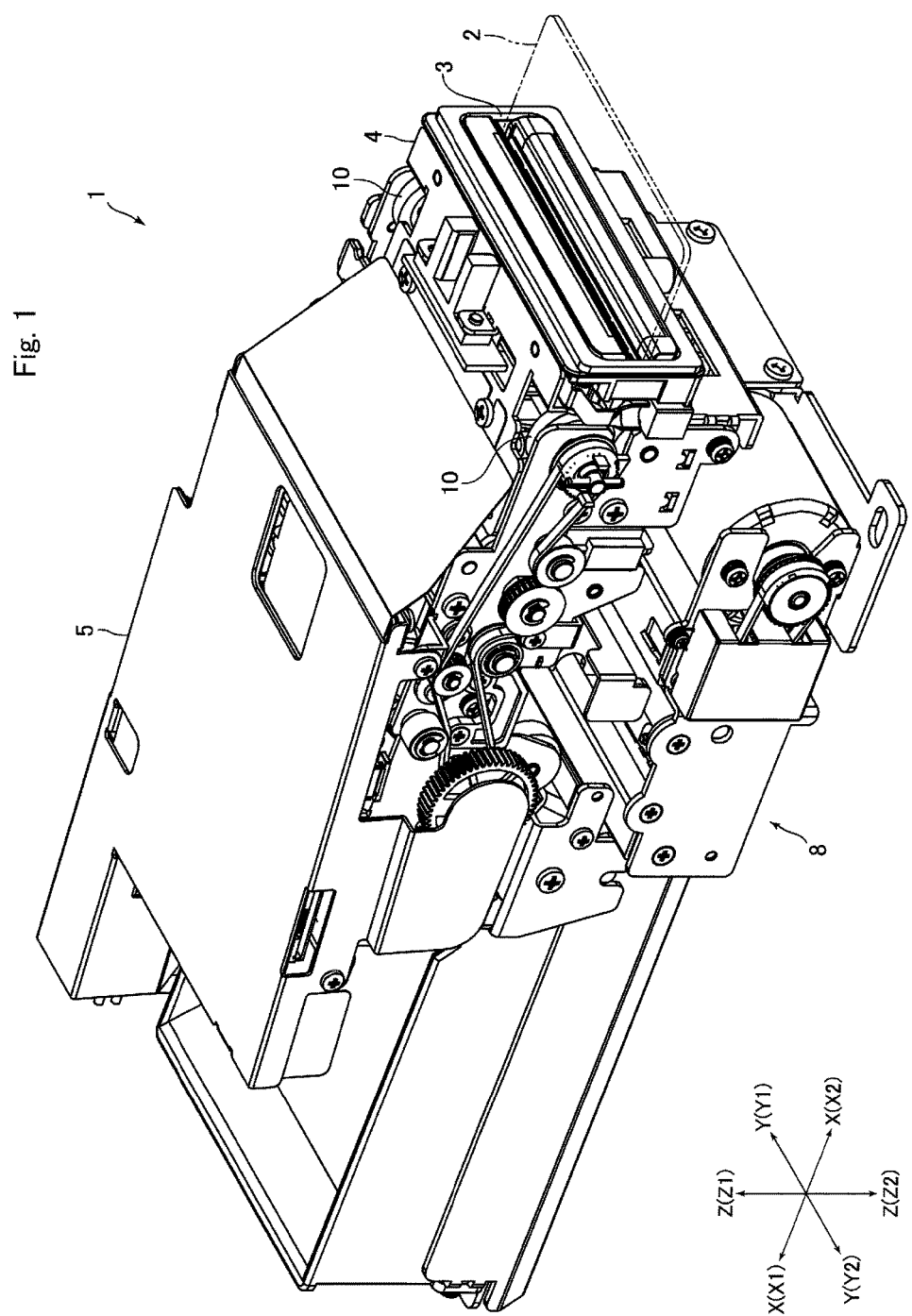
FIG. 1 is a perspective view showing a card reader in accordance with a first embodiment of the present invention.
Figure 2:
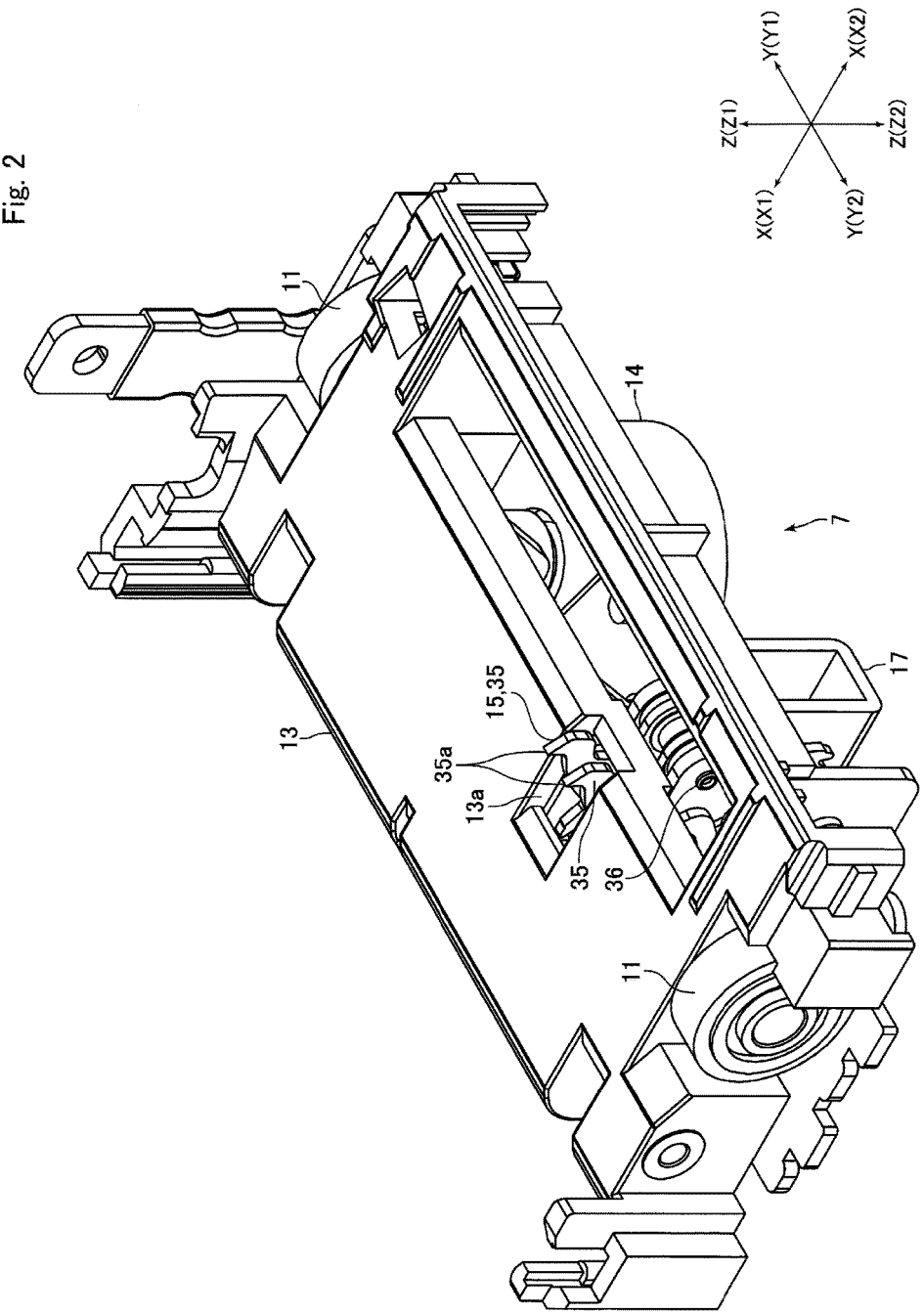
FIG. 2 is a perspective view showing a lower side portion relative to a card conveying passage of a card insertion part shown in FIG. 1.

FIG. 1 is a perspective view showing a card reader 1 in accordance with a first embodiment of the present invention. FIG. 2 is a perspective view showing a lower side portion relative to a card conveying passage of a card insertion part 4 shown in FIG. 1.

A card reader 1 in this embodiment is a device structured to perform at least one of reading of magnetic data recorded in a card 2 and recording of magnetic data to a card 2. The card reader 1 is mounted and used in a predetermined host apparatus such as an ATM (Automated Teller Machine). The card reader 1 includes a card insertion part 4 formed with a card insertion port 3 where a card 2 is inserted into and ejected from, and a main body part 5. A card conveying passage where a card 2 inserted into the card insertion port 3 is conveyed is formed in an inside of the card reader 1. Further, the card reader 1 includes a card lock mechanism 7 structured to prevent drawing of a card 2 from the card insertion port 3 when a card 2 is abnormally stopped in the card conveying passage by a fraudulent act of a criminal or the like and the card 2 is clogged in the card conveying passage. In other words, the card lock mechanism 7 is mounted and used in the card reader 1.

A card 2 is a card made of vinyl chloride whose thickness is about 0.7-0.8 mm. A card 2 in this embodiment is a card with a magnetic stripe in conformity with the international standard (for example, ISO/IEC7811) or JIS standard (for example, JISX6302) and is formed in a substantially rectangular shape whose four corners are rounded. A card 2 is formed with a magnetic stripe in which magnetic data is to be recorded. Further, an IC chip is incorporated in the card 2. A card 2 may be a PET (polyethylene terephthalate) card whose thickness is about 0.18-0.36 mm or may be a paper card having a predetermined thickness.

In this embodiment, a card 2 is conveyed in the "X" direction in FIG. 1 and the like. Specifically, a card 2 is taken in the "X1" direction and the card 2 is ejected in the "X2" direction. In other words, the "X" direction is a conveying direction of a card 2 conveyed along a card conveying passage, the "X1" direction is an inserting direction of the card 2 and the "X2" direction is an ejecting direction of the card 2. Further, in this embodiment, a card 2 is taken into the card reader 1 so that a short-side direction of the card 2 is coincided with the "X" direction. Further, the card 2 is conveyed in the card reader 1 so that the short-side direction of the card 2 is coincided with the "X" direction. In other words, the card reader 1 is structured to convey a card 2 in a short-side direction of the card 2 and perform predetermined processing.

The "Z" direction perpendicular to the "X" direction is a height direction of the card conveying passage and is a thickness direction of a card 2 conveyed along the card conveying passage. The "Y" direction perpendicular to the "X" direction and the "Z" direction is a width direction of the card conveying passage and a width direction of a card 2 conveyed along the card conveying passage. In this embodiment, the card reader 1 is disposed so that the "Z" direction and a vertical direction are coincided with each other. In the following descriptions, the "X" direction is referred to as a "front and rear direction", the "Y" direction is referred to as a "right and left direction", the "Z" direction is referred to as an "upper and lower direction". Further, the "X1" direction side is a "rear (back) side", the "X2" direction side is a "front" side, the "Y1" direction side is a "right" side, the "Y2" direction side is a "left" side, the "Z1" direction side is an "upper" side, and the "Z2" direction side is a "lower" side. In this embodiment, the right direction ("Y1" direction) is a first direction which is one side in a width direction of a card 2 and the left direction ("Y2" direction) is a second direction which is the other side in the width direction of the card 2.

The card insertion part 4 is attached to a front end face of a main body part 5. The main body part 5 includes a magnetic head (not shown) configured to perform at least one of reading of magnetic data recorded in a card 2 and recording of magnetic data to a card 2, and IC contact points (not shown) configured to perform data communication with an IC chip incorporated into the card 2.

The magnetic head is disposed so as to face a card conveying passage from a lower side with respect to the card conveying passage. Further, the magnetic head is mounted on a carriage (not shown) which is movable in the right and left direction. The carriage is connected with a carriage drive mechanism 8 and the magnetic head is moved in the right and left direction together with the carriage. Further, the magnetic head is moved up and down between a position where the magnetic head is capable of contacting with a card 2 and a position where the magnetic head is retreated from the card conveying passage. The IC contact points are disposed so as to face the card conveying passage from an upper side with respect to the card conveying passage. Further, the IC contact points are fixed to an IC contact block. The IC contact block is connected with an IC contact block drive mechanism and the IC contact points are moved up and down between a position where the IC contact points are capable of contacting with a card 2 and a position where the IC contact points are retreated from the card conveying passage.

The main body part 5 includes conveying rollers 10 (see FIG. 1) configured to abut with a card 2 and convey the card 2, and pad rollers 11 (see FIG. 2) oppositely disposed to the conveying rollers 10. The conveying rollers 10 are disposed so as to face the card conveying passage from an upper side. The pad rollers 11 are disposed so as to face the card conveying passage from a lower side.

(Structure of Card Lock Mechanism)

Figure 3:
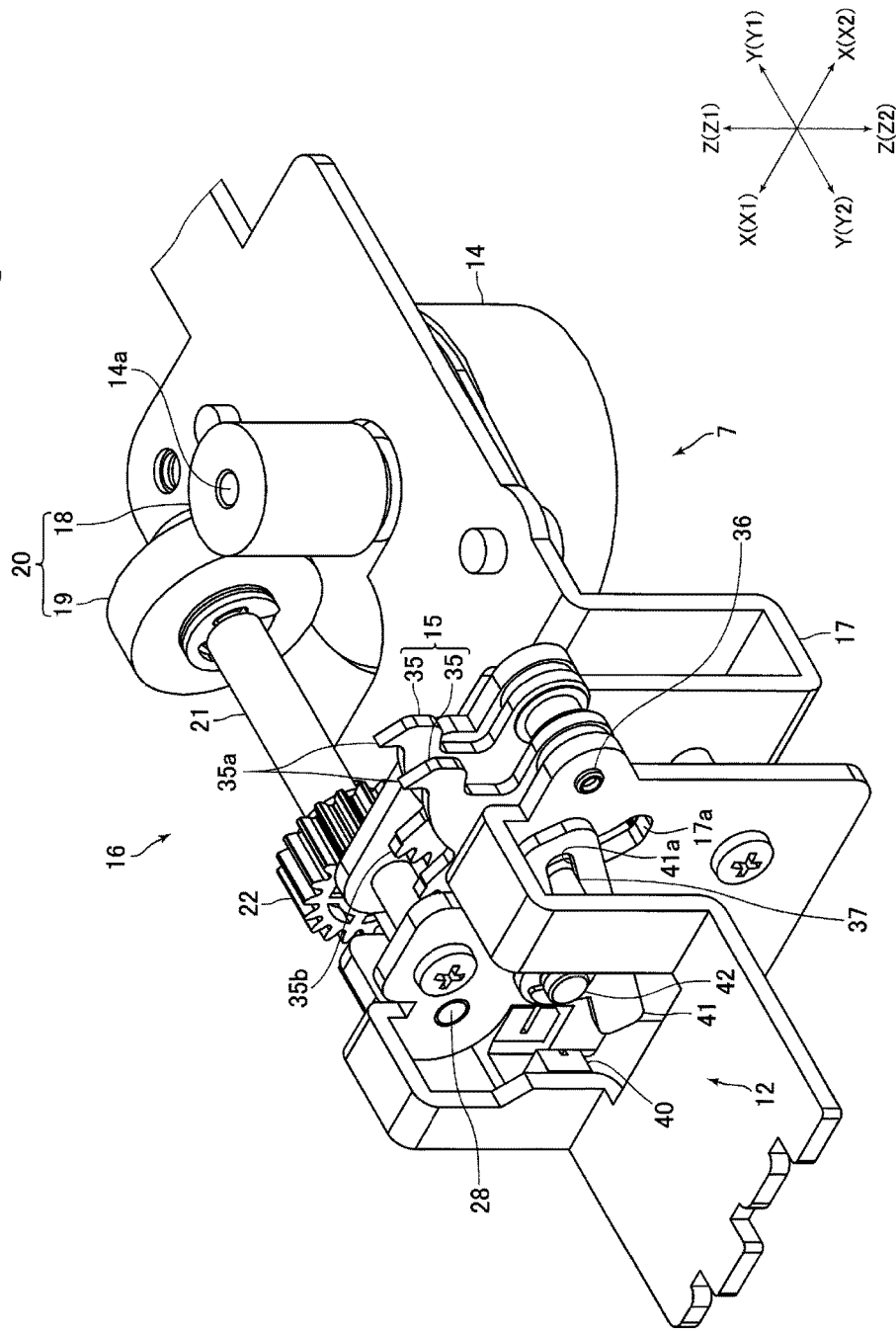
FIG. 3 is a perspective view showing a state that a lower frame is detached from a state shown in FIG. 2.
Figure 4:
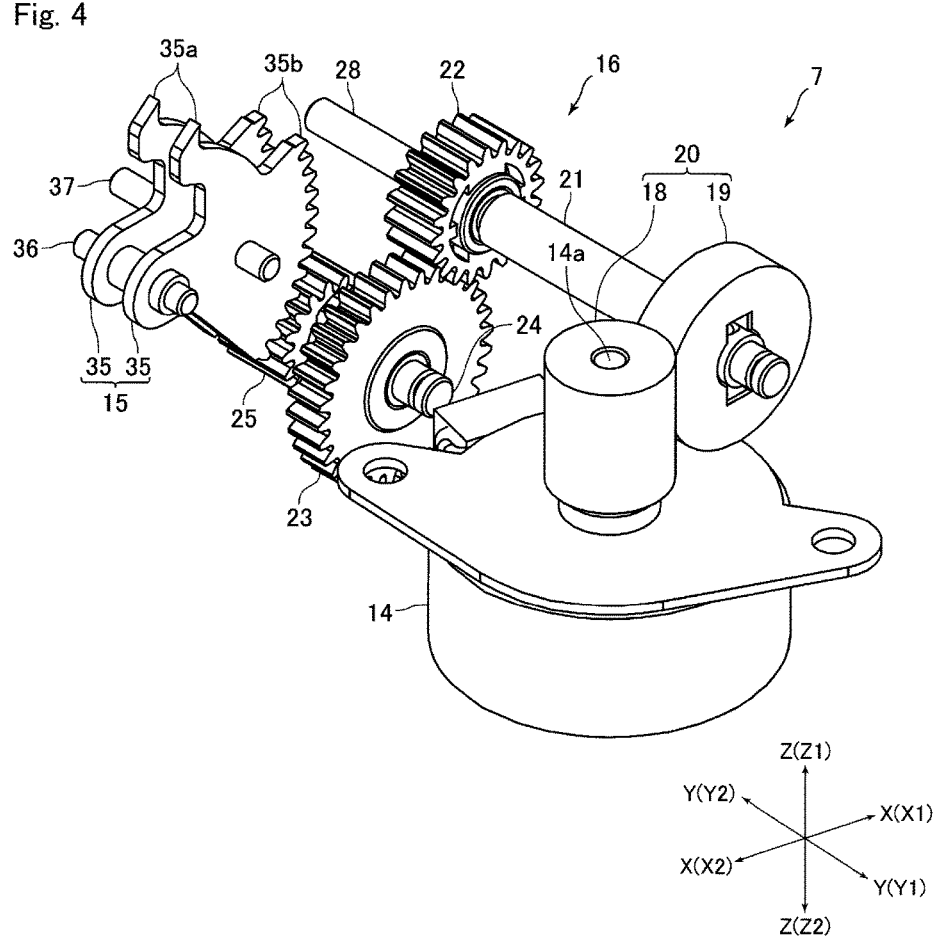
FIG. 4 is a perspective view showing a card lock mechanism in FIG. 3 which is viewed in another direction.
Figure 5:
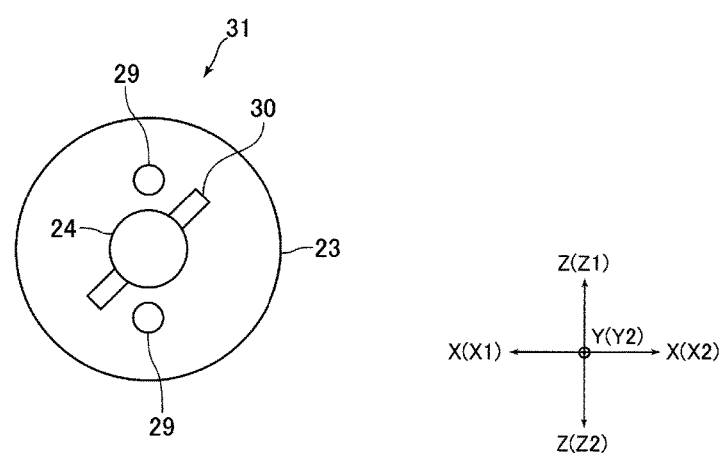
FIG. 5 is an explanatory schematic view showing a structure of a pin clutch which is disposed between a second gear and a second rotation shaft shown in FIG. 4.

FIG. 3 is a perspective view showing a state that a lower frame 13 is detached from a state shown in FIG. 2. FIG. 4 is a perspective view showing a card lock mechanism 7 in FIG. 3 which is viewed from another direction. FIG. 5 is an explanatory schematic view showing a structure of a pin clutch 31 which is disposed between a spur gear 23 and a rotation shaft 24 shown in FIG. 4.

The card lock mechanism 7 includes a motor 14, a lock member 15 configured to prevent drawing of a card 2, and a power transmission mechanism 16 structured to transmit power of the motor 14 to the lock member 15. The card lock mechanism 7 is disposed to a lower side of the card conveying passage. Specifically, the card lock mechanism 7 is, as shown in FIG. 2, disposed on a lower side with respect to a lower frame 13 which structures a lower face portion of the card conveying passage in the card insertion part 4. The lower frame 13 is formed with a passage opening 13a where prevention pawls 35a described below structuring the lock member 15 are passed so as to penetrate in the upper and lower direction. The card lock mechanism 7 includes a detection mechanism 12 (see FIG. 3) for detecting the lock member 15 which is located at a retreated position described below.

The motor 14 is a flat motor whose length in its axial direction is short. The motor 14 is disposed so that an axial direction of an output shaft 14a of the motor 14 and the upper and lower direction are parallel to each other. In other words, the motor 14 is disposed so that the axial direction of the output shaft 14a and the upper and lower direction are coincided with each other. Further, the motor 14 is fixed to a support frame 17 so that the output shaft 14a is protruded to an upper side. The support frame 17 is fixed to a lower side of the lower frame 13. A power transmission mechanism 16 includes a worm gear 20 structured of a screw gear 18 fixed to the output shaft 14a and a helical gear 19 engaged with the screw gear 18. In a transmitting direction of power from the motor 14 to the lock member 15, the screw gear 18 is disposed on a motor 14 side relative to the helical gear 19.

The power transmission mechanism 16 also includes a rotation shaft 21 to which the helical gear 19 is fixed, a spur gear 22 fixed to the rotation shaft 21, a spur gear 23 engaged with the spur gear 22, a rotation shaft 24 which is disposed in parallel with the rotation shaft 21 and relatively rotatably holds the spur gear 23, and a spur gear 25 which is fixed to the rotation shaft 24. The rotation shaft 21 in this embodiment is a first rotation shaft, the rotation shaft 24 is a second rotation shaft, the spur gear 22 is a first gear, and the spur gear 23 is a second gear. Further, the spur gear 25 is a final gear which is disposed on a side closest to the lock member 15 in the transmitting direction of power from the motor 14 to the lock member 15. The spur gear 25 is engaged with sector gears 35b which are formed in lock plates 35 described below structuring the lock member 15.

The rotation shaft 21 is disposed so that an axial direction of the rotation shaft 21 and the right and left direction are parallel to each other. In other words, the rotation shaft 21 is disposed so that its axial direction and the right and left direction are coincided with each other. Further, the rotation shaft 21 is formed in a hollow shape. In other words, the rotation shaft 21 is formed in a long and thin cylindrical tube shape. A fixed shaft 28 is inserted on an inner peripheral side of the rotation shaft 21. The fixed shaft 28 is fixed to the support frame 17 so that an axial direction of the fixed shaft 28 and the right and left direction are coincided with each other. The helical gear 19 is fixed to a right end side of the rotation shaft 21 and the spur gear 22 is fixed to a left end side of the rotation shaft 21. In other words, the helical gear 19 is disposed on a right side relative to the spur gear 22. Further, the helical gear 19 is disposed on a rear side of the screw gear 18. In other words, the rotation shaft 21 is disposed on a rear side relative to the screw gear 18.

The rotation shaft 24 is disposed so that an axial direction of the rotation shaft 24 and the right and left direction are parallel to each other. In other words, the rotation shaft 24 is disposed so that its axial direction and the right and left direction are coincided with each other. Further, the rotation shaft 24 is rotatably held by the support frame 17. The rotation shaft 24 is disposed between an upper end of the motor 14 and a lower end of the motor 14 in the upper and lower direction. Further, the rotation shaft 24 is disposed on a front side relative to the rotation shaft 21. The spur gear 23 is relatively rotatably held by the rotation shaft 24 on a right end side of the rotation shaft 24. The spur gear 25 is fixed to a left end side of the rotation shaft 24 and is disposed on a left side relative to the spur gear 23.

A left side face of the spur gear 23 is fixed with two gear side pins 29 in a cylindrical shape so as to protrude to the left direction (see FIG. 5). The two gear side pins 29 are fixed to the spur gear 23 with 180° pitch around the rotation shaft 24. The rotation shaft 24 is fixed with a shaft side pin 30 protruding to both sides in its radial direction (see FIG. 5). The shaft side pin 30 is disposed on a left side relative to the spur gear 23 so as to be capable of contacting with the two gear side pins 29. In this embodiment, a pin clutch 31 is structured by the two gear side pins 29 and the shaft side pin 30 so that power transmission between the spur gear 23 and the rotation shaft 24 is connected and disconnected in the power transmission path between the motor 14 and the lock member 15.

The lock member 15 is disposed on a left side relative to the spur gear 23. The lock member 15 is provided with two lock plates 35 which are formed with prevention pawls 35a configured to contact with a card 2 and prevent drawing of the card 2. The lock plate 35 is, in addition to the prevention pawl 35a, formed with a sector gear 35b which is engaged with the spur gear 25. The lock plate 35 is formed in a flat plate shape and is disposed so that a thickness direction of the lock plate 35 and the right and left direction are coincided with each other. A front end side portion of the lock plate 35 is turnably held by a fixed shaft 36 which is fixed to the support frame 17. In other words, a front end side portion of the lock member 15 is turnably held by the fixed shaft 36. The fixed shaft 36 is disposed so that an axial direction of the fixed shaft 36 and the right and left direction are coincided with each other. The two lock plates 35 are held by the fixed shaft 36 with a predetermined space therebetween in the right and left direction.

The prevention pawl 35a is formed on an upper end side of the lock plate 35. The prevention pawl 35a is disposed on a rear side relative to the fixed shaft 36. The prevention pawl 35a is formed in a triangular shape whose width becomes narrower as going toward its tip end side when viewed in the right and left direction. In other words, a tip end of the prevention pawl 35a is pointed. The sector gear 35b is provided with a plurality of teeth engaged with the spur gear 25. The sector gear 35b is formed on a rear end side of the lock plate 35. Specifically, a rear end side portion of the lock plate 35 is formed in a fan shape with the fixed shaft 36 as a center when viewed in the right and left direction and the sector gear 35b is formed on a rear end face of the lock plate 35.

The lock member 15 is disposed to a lower side of the card conveying passage so that the prevention pawls 35a are contacted with a card 2 from a lower side. Further, the lock member 15 is disposed so that the prevention pawls 35a are passed the passage opening 13a of the lower frame 13 to be contacted with a card 2 from a lower side.

The lock member 15 is movable between a contact position where the prevention pawls 35a are contacted with a card 2 and a retreated position where the prevention pawls 35a are retreated from the card conveying passage by power transmitted from the motor 14 through the power transmission mechanism 16. In other words, the lock member 15 is turned with the fixed shaft 36 as a center and is moved between the contact position and the retreated position by power transmitted from the motor 14. When the lock member 15 is located at the retreated position, the prevention pawls 35a are disposed to a lower side of the lower frame 13 and are not contacted with a card 2. On the other hand, when the lock member 15 is located at the contact position, as shown in FIG. 2, tip end sides of the prevention pawls 35a are protruded to an upper side of the lower frame 13 and are capable of contacting with a card 2. In this case, base end sides of the prevention pawls 35a are disposed in an inside of the passage opening 13a.

In this embodiment, when the motor 14 is rotated so that the spur gear 25 is turned in a clockwise direction in FIG. 4 (hereinafter, this direction is referred to as a "clockwise direction"), the lock member 15 is turned in a counterclockwise direction in FIG. 4 (hereinafter, this direction is referred to as a "counterclockwise direction") with the fixed shaft 36 as a center, and the lock member 15 is moved toward the contact position from the retreated position. Further, when the motor 14 is rotated so that the spur gear 25 is turned in a counterclockwise direction, the lock member 15 is turned in a clockwise direction with the fixed shaft 36 as a center and the lock member 15 is moved toward the retreated position from the contact position. The lock member 15 is fixed with guide pins 37 which are protruded to both sides in the right and left direction. The guide pins 37 are engaged with guide grooves 17a (see FIG. 3) which are formed in the support frame 17. The lock member 15 moved between the contact position and the retreated position are guided by the guide pins 37 and the guide grooves 17a.

When the lock member 15 is located at the contact position, the prevention pawls 35a are, as shown in FIG. 2, inclined to a rear side as going toward an upper side. Specifically, the prevention pawls 35a are protruded toward a rear upper side so that, when the lock member 15 is located at the contact position, a tip end of the prevention pawl 35a formed in a triangular shape is directed to a rear upper side. When drawing force to a front side is applied to a card 2 in a state that the prevention pawls 35a are contacted with the card 2, turning force in a counterclockwise direction is generated in the lock member 15 and tip ends of the prevention pawls 35a stick into the card 2.

A detection mechanism 12 includes, as shown in FIG. 3, a sensor 40 and an intercept member 41. The sensor 40 is a transmission type optical sensor having a light emitting element and a light receiving element receiving light from the light emitting element. The sensor 40 is fixed to a left end side of the support frame 17. The intercept member 41 is formed in a flat plate shape and is disposed so that a thickness direction of the intercept member 41 and the right and left direction are coincided with each other. Further, the intercept member 41 is disposed on a left side relative to the lock member 15.

The intercept member 41 is turnably held by a fixed shaft 42 which is fixed to the support frame 17. The fixed shaft 42 is disposed so that an axial direction of the fixed shaft 42 and the right and left direction are coincided with each other. The intercept member 41 is formed with a cam groove 41a into which a left end side portion of the guide pin 37 is inserted and the intercept member 41 is moved together with the lock member 15. Specifically, when the lock member 15 is turned, the intercept member 41 is turned with the fixed shaft 42 as a center. Further, the intercept member 41 intercepts light from the light emitting element of the sensor 40 to the light receiving element when the lock member 15 is located at the retreated position. Therefore, it is detected by the detection mechanism 12 that the lock member 15 is located at the retreated position.

(Principal Effects in this Embodiment)

As described above, in this embodiment, the sector gear 35b engaged with the spur gear 25 is formed in the lock plate 35 which is formed with the prevention pawl 35a configured to prevent drawing of a card 2 by contacting with the card 2. In other words, in this embodiment, the prevention pawl 35a and the sector gear 35b are integrally formed with each other. Therefore, according to this embodiment, different from the card reader described in the above-mentioned Patent Literature, rattling does not occur in a connecting portion of the lock lever with the connecting lever and in a connecting portion of the connecting lever with the fan-shaped gear and, in addition, the connecting lever is not deformed. Accordingly, in this embodiment, the prevention pawl 35a is prevented from being disengaged from a card 2 in a state that drawing is prevented by the prevention pawl 35a contacted with the card.

In this embodiment, the screw gear 18 and the helical gear 19 are disposed on a right side relative to the spur gears 22 and 23, the gear side pins 29 are fixed to a left side face of the spur gear 23 so as to protrude to the left direction, and the shaft side pin 30, the spur gear 25 and the lock member 15 are disposed on a left side relative to the spur gears 22 and 23. In other words, in this embodiment, structural components of the card lock mechanism 7 are arranged in the right and left direction. Therefore, according to this embodiment, the size in the front and rear direction of the card lock mechanism 7 can be reduced.

Especially, in this embodiment, the rotation shaft 21 is disposed on a rear side relative to the screw gear 18 and the rotation shaft 24 is disposed on a front side relative to the rotation shaft 21 and thus, in the front and rear direction, the size of the card lock mechanism 7 can be further reduced. Further, in this embodiment, in the upper and lower direction, the rotation shaft 24 is disposed between an upper end of the motor 14 and a lower end of the motor 14 and thus, in the upper and lower direction, the size of the card lock mechanism 7 can be reduced.

In this embodiment, the power transmission mechanism 16 includes the pin clutch 31 and thus output of the motor 14 is surely transmitted to the lock member 15 to drive the lock member 15 and, in addition, fraudulent drawing of a card 2 can be prevented further effectively. In other words, in this embodiment, the lock member 15 is structured so as to be capable of moving slightly in the drawing direction and the lock member 15 is capable of moving together with a card 2. Therefore, in comparison with a case that the lock member 15 is not moved at all at the time of drawing of a card 2, the prevention pawl 35a can be further pressed against or stuck into the surface of a card 2. Further, in this embodiment, at the time of fraudulent drawing of a card 2, the rotation shaft 24 idles during a predetermined time period due to operation of the pin clutch 31 and thus the prevention pawl 35a is permitted to be further stuck into the card 2. On the other hand, when a card 2 is pushed to a rear side of the card reader 1, the rotation shaft 24 does not idle due to operation of the pin clutch 31 and movement of the lock member 15 is restricted and thus the card 2 is not moved to the rear side.

[Second Embodiment]

A card reader 51 in this embodiment is, similarly to the card reader 1 in the first embodiment, a device structured to perform at least one of reading of magnetic data recorded in a card 2 and recording of magnetic data to a card 2. The card reader 51 is mounted and used in a predetermined host apparatus such as an ATM. A structure of the card reader 51 will be described below. In the following descriptions, the same reference signs are used in the same or common structures as the first embodiment and their explanations are omitted or simplified.

(Schematic Structure of Card Reader)

Figure 6:
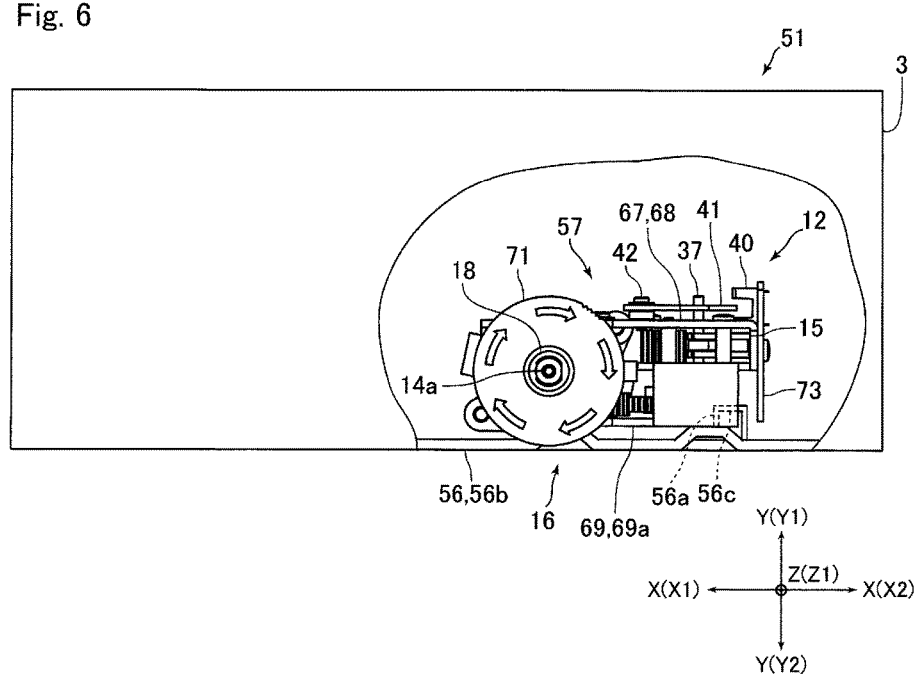
FIG. 6 is a schematic plan view showing a card reader in accordance with a second embodiment of the present invention.
Figure 7:
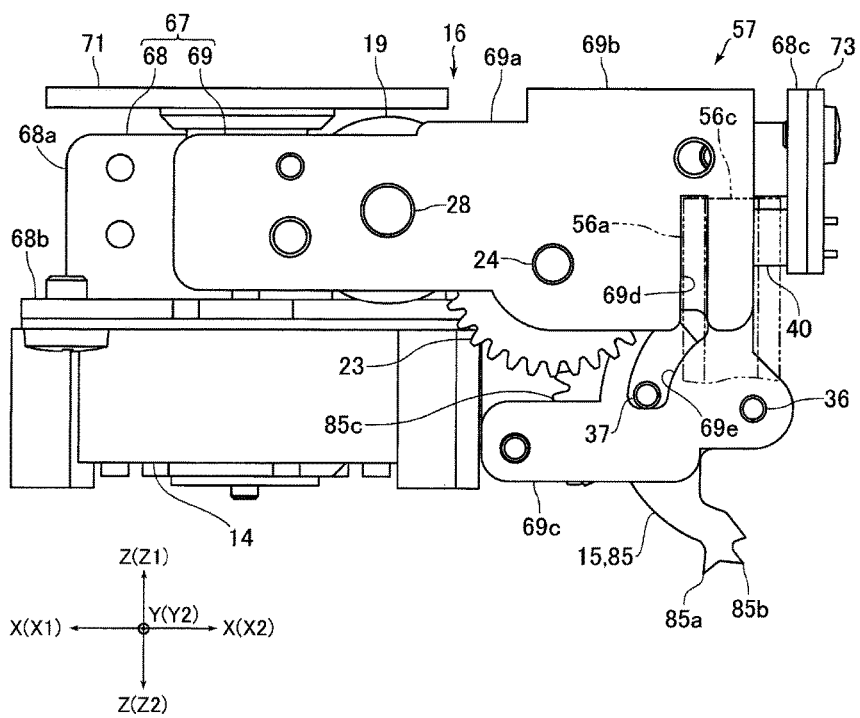
FIG. 7 is a side view showing a card lock mechanism in FIG. 6.

FIG. 6 is a schematic plan view showing a card reader 51 in accordance with a second embodiment of the present invention. FIG. 7 is a side view showing a card lock mechanism 57 in FIG. 6.

Similarly to the card reader 1 in the first embodiment, the card reader 51 is formed with a card insertion port 3 where a card 2 is inserted into and ejected from. Further, a card conveying passage where a card 2 inserted into the card insertion port 3 is conveyed is formed in an inside of the card reader 51. Further, the card reader 51 includes a card lock mechanism 57 structured to prevent drawing of a card 2 from the card insertion port 3 when a card 2 is abnormally stopped in the card conveying passage by a fraudulent act of a criminal or the like and the card 2 is clogged in the card conveying passage. Further, the card reader 51 includes a magnetic head (not shown) configured to perform at least one of reading of magnetic data recorded in a card 2 and recording of magnetic data to a card 2, and IC contact points (not shown) configured to perform data communication with an IC chip incorporated into the card 2.

Similarly to the first embodiment, in the second embodiment, a card 2 is conveyed in the "X" direction shown in FIG. 6 and the like. Further, a card 2 is taken in the "X1" direction and the card 2 is ejected in the "X2" direction. Further, in this embodiment, a card 2 is taken into the card reader 51 so that a longitudinal direction of the card 2 and the "X" direction are coincided with each other, and the card 2 is conveyed in the card reader 51 so that a longitudinal direction of the card 2 and the "X" direction are coincided with each other. In the following descriptions, similarly to the first embodiment, the "X" direction is referred to as a "front and rear direction", the "Y" direction is referred to as a "right and left direction", the "Z" direction is referred to as an "upper and lower direction". Further, the "X1" direction side is a "rear (back) side", the "X2" direction side is a "front" side, the "Y1" direction side is a "right" side, the "Y2" direction side is a "left" side, the "Z1" direction side is an "upper" side, and the "Z2" direction side is a "lower" side. The "Z" direction is a thickness direction of a card 2 which is conveyed in the card conveying passage, and the "Y" direction is a width direction of a card 2 which is conveyed in the card conveying passage. Further, in this embodiment, an upper direction ("Z1" direction) is a third direction which is one side in a thickness direction of a card 2 and a lower direction ("Z2" direction) is a fourth direction which is the other side in the thickness direction of the card 2.

A main body frame 56 of the card reader 51 is formed with an engaging wall part 56a which is engaged with an engaging groove 69d formed in the card lock mechanism 57 described below. The engaging wall part 56a is formed so as to stand up to an upper side from an upper face part which structures an upper face portion of the card conveying passage. Further, the engaging wall part 56a is formed in a flat plate shape and is disposed so that its thickness direction and the front and rear direction are coincided with each other. A left end of the engaging wall part 56a is connected with a side wall part 56b which structures a left side face of the main body frame 56. Further, a right end of the engaging wall part 56a is connected with a wall part 56c which is formed in a flat plate shape. The wall part 56c is formed so as to stand up to an upper side from an upper face part structuring an upper face portion of the card conveying passage and is disposed so that its thickness direction and the right and left direction are coincided with each other.

(Structure of Card Lock Mechanism)

Figure 8:
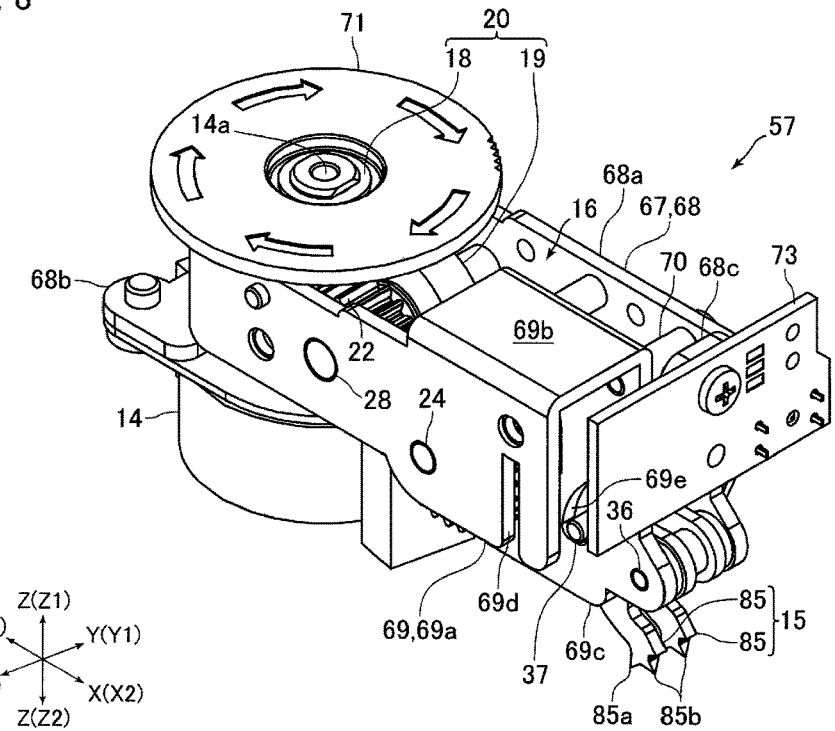
FIG. 8 is a perspective view showing the card lock mechanism in FIG. 7.
Figure 9:
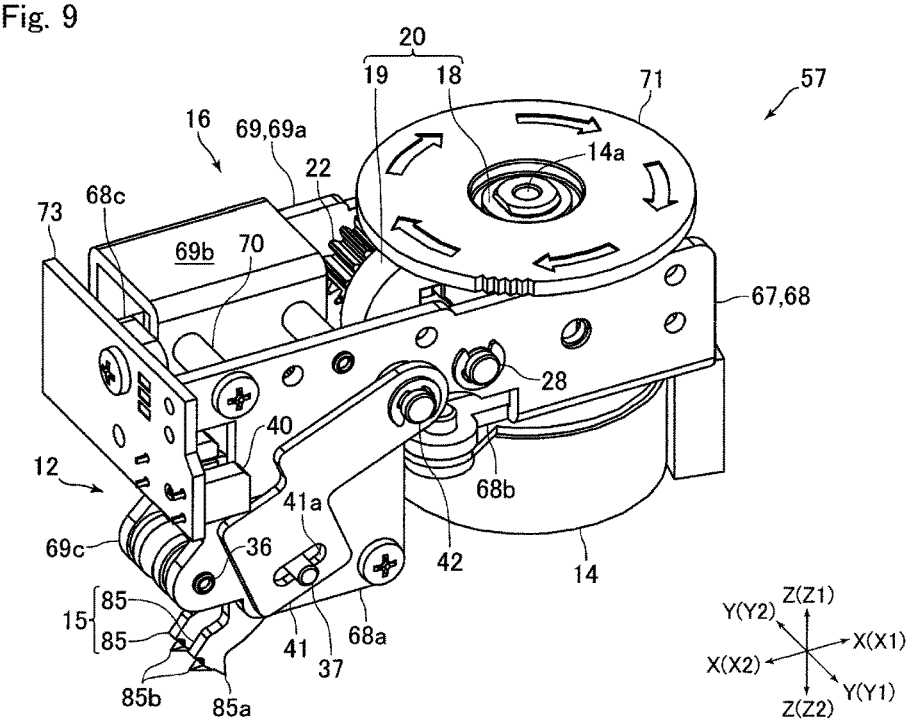
FIG. 9 is a perspective view showing the card lock mechanism in FIG. 8 which is viewed in another direction.
Figure 11:
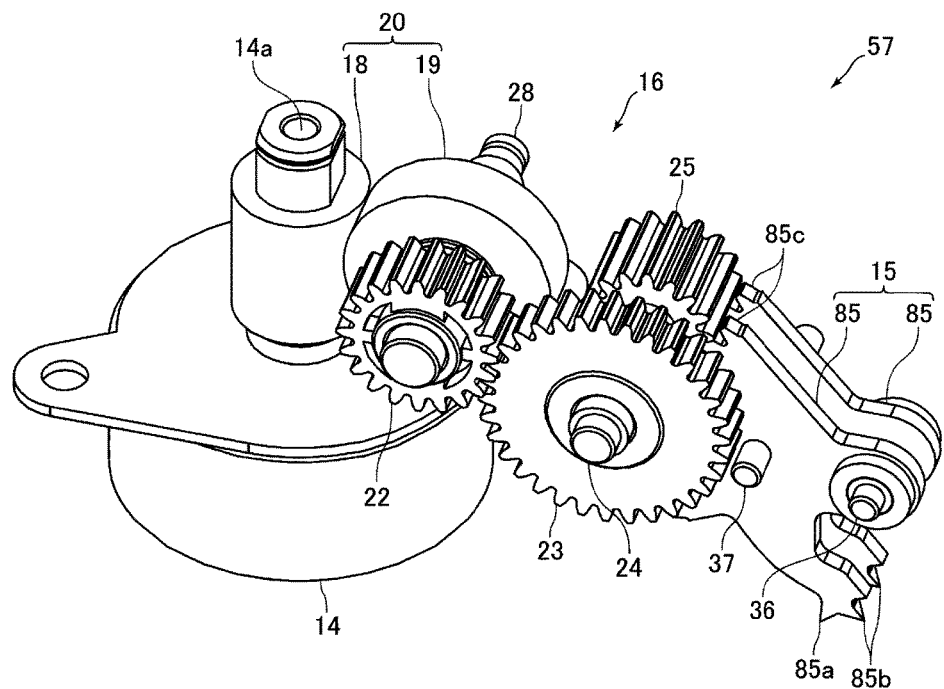
FIG. 11 is a perspective view showing a state that a support frame and a knob are detached from the card lock mechanism in FIG. 8 which is viewed in another direction.

FIG. 8 is a perspective view showing the card lock mechanism 57 in FIG. 7. FIG. 9 is a perspective view showing the card lock mechanism 57 in FIG. 8 which is viewed in another direction. FIG. 10 is a plan view showing a state that a knob 71 is detached from the card lock mechanism 57 in FIG. 7. FIG. 11 is a perspective view showing a state that a support frame 67, a knob 71 and the like are detached from the card lock mechanism 57 in FIG. 8 which is viewed in another direction.

The card lock mechanism 57 is disposed to an upper side of the card conveying passage. The card lock mechanism 57 includes, similarly to the card lock mechanism 7, a detection mechanism 12, a motor 14, a lock member 15 and a power transmission mechanism 16. Further, the card lock mechanism 57 includes a support frame 67 to which the detection mechanism 12, the motor 14, the lock member 15 and the power transmission mechanism 16 are attached. The support frame 67 is structured of two frames, i.e., a first frame 68 and a second frame 69, and a connecting shaft 70 for connecting the first frame 68 with the second frame 69. The first frame 68 and the second frame 69 are formed by bending a metal plate such as a steel plate in a predetermined shape.

The first frame 68 is structured of a side face part 68*a* in a flat plate shape which structures a right side face of the support frame 67, a motor fixing part 68*b* in a flat plate shape to which the motor 14 is fixed, and a circuit board fixing part 68*c* in a flat plate shape to which a sensor circuit board 73 described below is fixed. The side face part 68*a* is disposed so that its thickness direction and the right and left direction are coincided with each other. The motor fixing part 68*b* is disposed so that its thickness direction and the upper and lower direction are coincided with each other. Further, the motor fixing part 68*b* is connected with a lower end on a rear end side of the side face part 68*a* and is extended toward a left side from the rear end side of the side face part 68*a*. The circuit board fixing part 68*c* is disposed so that its thickness direction and the front and rear direction are coincided with each other. Further, the circuit board fixing part 68*c* is connected with a front end of the side face part 68*a* and is extended toward a left side from a front end of the side face part 68*a*. The side face part 68*a* in this embodiment is a first side plate which structures one side face in the right and left direction of the card lock mechanism 57.

The second frame 69 is structured of a side face part 69*a* in a flat plate shape which structures a left side face of the support frame 67, an upper face part 69*b* in a flat plate shape which is connected with an upper end face of the side face part 69*a*, and an inner side face part 69*c* in a flat plate shape which is disposed in parallel with the side face part 69*a*. The side face part 69*a* is disposed so that its thickness direction and the right and left direction are coincided with each other. The upper face part 69*b* is disposed so that its thickness direction and the upper and lower direction are coincided with each other. Further, the upper face part 69*b* is connected with an upper end on a front end side of the side face part 69*a* and is extended toward a right side from the front end side of the side face part 69*a*. The inner side face part 69*c* is disposed so that its thickness direction and the right and left direction are coincided with each other. Further, the inner side face part 69*c* is connected with a right end of the upper face part 69*b* and is extended toward a lower side from a right end of the upper face part 69*b*. The side face part 69*a* in this embodiment is a second side plate which structures the other side face in the right and left direction of the card lock mechanism 57. The connecting shaft 70 is disposed so that an axial direction of the connecting shaft 70 and the right and left direction are coincided with each other. Further, the connecting shaft 70 is disposed between the side face part 68*a* and the inner side face part 69*c*.

The side face part 69*a* (in other words, a left side face of the support frame 67) is formed with an engaging groove 69*d* in a slit shape whose longitudinal direction is an upper and lower direction. The engaging groove 69*d* is formed toward an upper side from a lower end face of the side face part 69*a*. Further, the engaging groove 69*d* is formed on a front end side of the side face part 69*a* so as to penetrate through the side face part 69*a* in the right and left direction. A width of the engaging groove 69*d* in the front and rear direction is set to be substantially equal to a thickness of the engagement wall part 56*a* (thickness in the front and rear direction) of the main body frame 56. As shown in FIG. 7, the engaging groove 69*d* is engaged with the engagement wall part 56*a*. In this embodiment, the side face part 69*a* is fixed to the side wall part 56*b* of the main body frame 56 by using a screw not shown and thereby the card lock mechanism 57 is fixed to the main body frame 56.

The motor 14 is disposed so that an axial direction of an output shaft 14*a* of the motor 14 and the upper and lower direction are parallel to each other, and the motor 14 is fixed to the motor fixing part 68*b* of the support frame 67 so that the output shaft 14*a* is protruded to an upper side. Similarly to the first embodiment, the power transmission mechanism 16 includes a worm gear 20 structured of a screw gear 18 and a helical gear 19. Further, the power transmission mechanism 16 includes a rotation shaft 21, a spur gear 22, a spur gear 23, a rotation shaft 24 and a spur gear 25. The spur gear 25 is engaged with sector gears 85*c* which are formed in lock plates 85 structuring the lock member 15 as described below. The power transmission mechanism 16 is disposed between the side face part 68*a* and the side face part 69*a* in the right and left direction.

A knob 71 for manually rotating the output shaft 14*a* is fixed to the screw gear 18 on its upper end side. The rotation shaft 21 is formed in a long and thin cylindrical tube shape and is disposed so that an axial direction of the rotation shaft 21 and the right and left direction are coincided with each other. A fixed shaft 28 is inserted on an inner peripheral side of the rotation shaft 21, and the fixed shaft 28 is fixed to the support frame 67 so that an axial direction of the fixed shaft 28 and the right and left direction are coincided with each other. The helical gear 19 is fixed to the rotation shaft 21 at its substantially center position, and the spur gear 22 is fixed to the rotation shaft 21 on its left end side. In other words, the spur gear 22 is disposed on a left side relative to the helical gear 19. Further, the helical gear 19 is disposed to a front side of the screw gear 18, and the rotation shaft 21 is disposed on the front side relative to the screw gear 18. In other words, the rotation shaft 21 is disposed on a front side relative to the output shaft 14*a*.

The rotation shaft 24 is disposed so that an axial direction of the rotation shaft 24 and the right and left direction are coincided with each other and is turnably held by the support frame 67. The rotation shaft 24 is disposed between an upper end of the motor 14 and a lower end of the motor 14 in the upper and lower direction. Further, the rotation shaft 24 is disposed on a front side relative to the rotation shaft 21. The spur gear 23 is relatively turnably held by the rotation shaft 24 on a left end side of the rotation shaft 24 and is disposed on a left side relative to the helical gear 19. The spur gear 25 is fixed to the rotation shaft 24 on its right end side. The spur gear 25 is disposed between the side face part 68*a* and the inner side face part 69*c* in the right and left direction. Further, the spur gear 25 is disposed on a right side relative to the helical gear 19.

Similarly to the first embodiment, two gear side pins 29 in a cylindrical shape are fixed to a right side face of the spur gear 23 so as to protrude to the right direction. The two gear side pins 29 are fixed to the spur gear 23 with 180° pitch around the rotation shaft 24. The rotation shaft 24 is fixed with a shaft side pin 30 protruding to both sides in its radial direction. The shaft side pin 30 is disposed on a right side relative to the spur gear 23 so as to be capable of contacting with the two gear side pins 29. Also in this embodiment, a pin clutch 31 is structured of two gear side pins 29 and the shaft side pin 30.

The lock member 15 is disposed between the side face part 68*a* and the side face part 69*a* in the right and left direction. Specifically, the lock member 15 is disposed between the side face part 68*a* and the inner side face part 69*c* in the right and left direction. Further, the lock member 15 is disposed on a right side relative to the helical gear 19. The lock member 15 includes two lock plates 85 which are formed with two prevention pawls 85*a* and 85*b* configured to contact with a card 2 and prevent drawing of the card 2. The lock plates 85 are formed with sector gears 85*c* engaged with the spur gear 25 in addition to the prevention pawls 85*a* and 85*b*. The lock plate 85 is formed in a flat plate shape and is disposed so that a thickness direction of the lock plate 85 and the right and left direction are coincided with each other.

A front end side portion of the lock plate 85 is turnably held by a fixed shaft 36 which is fixed to the support frame 67. The fixed shaft 36 is disposed so that an axial direction of the fixed shaft 36 and the right and left direction are coincided with each other. Further, the fixed shaft 36 is disposed on a front side relative to the rotation shaft 24. Two lock plates 85 are held by the fixed shaft 36 with a predetermined space therebetween in the right and left direction.

The prevention pawls 85*a* and 85*b* are formed on lower end sides of the lock plates 85 and are disposed on a rear side relative to the fixed shaft 36. Further, the prevention pawl 85*a* is disposed on a rear side relative to the prevention pawl 85*b*. The prevention pawls 85*a* and 85*b* are formed in a triangular shape whose width becomes narrow as going toward its tip end side when viewed in the right and left direction. In other words, tip ends of the prevention pawls 85*a* and 85*b* are pointed. The sector gear 85*c* is provided with a plurality of teeth engaged with the spur gear 25. The sector gear 85*c* is formed on a rear end side of the lock plate 85. Specifically, a rear end side portion of the lock plate 85 is formed in a fan shape with the fixed shaft 36 as a center which is viewed in the right and left direction. The sector gear 85*c* is formed on the rear end face of the lock plate 85.

The lock member 15 is disposed to an upper side of the card conveying passage so that the prevention pawls 85*a* and 85*b* are contacted with a card 2 from an upper side. The lock member 15 is movable between a contact position where the prevention pawls 85*a* and 85*b* are contacted with a card 2 and a retreated position where the prevention pawls 85*a* and 85*b* are retreated from the card conveying passage by power transmitted from the motor 14 through the power transmission mechanism 16. In other words, the lock member 15 is turned with the fixed shaft 36 as a center by power transmitted from the motor 14 and is moved between the contact position and the retreated position. When the lock member 15 is located at the retreated position, the prevention pawls 85*a* and 85*b* are disposed on an upper side relative to the card conveying passage and do not contact with a card 2. On the other hand, when the lock member 15 is located at the contact position, the tip end sides of the prevention pawls 85*a* and 85*b* are capable of contacting with a card 2.

In this embodiment, when the motor 14 is rotated so that the spur gear 25 is turned in a counterclockwise direction in FIG. 11, the lock member 15 is turned in a clockwise direction in FIG. 11 with the fixed shaft 36 as a center and thus, the lock member 15 is moved toward the contact position from the retreated position. In this case, the prevention pawls 85*a* and 85*b* are moved to a lower side. Further, when the motor 14 is rotated so that the spur gear 25 is turned in a clockwise direction, the lock member 15 is turned in a counterclockwise direction with the fixed shaft 36 as a center and thus, the lock member 15 is moved to the retreated position from the contact position.

Similarly to the first embodiment, the lock member 15 is fixed with guide pins 37 protruded to both sides in the right and left direction. The guide pins 37 are engaged with a guide groove (not shown) formed in the side face part 68*a* of the first frame 68 and a guide groove 69*e* formed in the inner side face part 69*c* of the second frame 69. The lock member 15 moved between the contact position and the retreated position is guided by the guide groove formed in the side face part 68*a*, the guide groove 69*e* and the guide pins 37.

As shown in FIG. 7, the prevention pawl 85*a* is inclined to a rear side as going to a lower side when the lock member 15 is located at the contact position. Specifically, when the lock member 15 is located at the contact position, the prevention pawl 85*a* is protruded toward a rear lower side so that a tip end of the prevention pawl 85*a* formed in a triangular shape is directed to a rear lower side. Further, the prevention pawl 85*b* is inclined to a front side as going to a lower side when the lock member 15 is located at the contact position. Specifically, when the lock member 15 is located at the contact position, the prevention pawl 85*b* is protruded toward a front lower side so that a tip end of the prevention pawl 85*b* formed in a triangular shape is directed to a front lower side.

When drawing force to a front side is applied to a card 2 in a state that the prevention pawls 85*a* and 85*b* are contacted, turning force in a counterclockwise direction is generated in the lock member 15 and a tip end of the prevention pawl 85*a* sticks into the card 2. On the other hand, when pressing force to a rear side is applied to a card 2 in a state that the prevention pawls 85*a* and 85*b* are contacted, turning force in a clockwise direction is generated in the lock member 15 and a tip end of the prevention pawl 85*b* sticks into the card 2.

The detection mechanism 12 includes, similarly to the first embodiment, a sensor 40 and an intercept member 41 (see FIGS. 9 and 10). The sensor 40 is fixed to a circuit board fixing part 68*c* of the first frame 68 through a sensor circuit board 73. The intercept member 41 is disposed on the right side of the side face part 68*a* so that its thickness direction and the right and left direction are coincided with each other. Further, the intercept member 41 is turnably held by a fixed shaft 42 which is fixed to the side face part 68*a*. The fixed shaft 42 is disposed so that an axial direction of the fixed shaft 42 and the right and left direction are coincide with each other. The intercept member 41 is formed with a cam groove 41*a* into which a right end side portion of the guide pin 37 is inserted (see FIG. 9), and the intercept member 41 is moved together with the lock member 15. Specifically, when the lock member 15 is turned, the intercept member 41 is turned with the fixed shaft 42 as a center. Further, the intercept member 41 intercepts light from the light emitting element to the light receiving element of the sensor 40 when the lock member 15 is located at the retreated position. Therefore, the lock member 15 is detected to be located at the retreated position by the detection mechanism 12.

(Principal Effects in this Embodiment)

As described above, also in this embodiment, similarly to the first embodiment, the sector gear 85*c* is formed in the lock plate 85 which is formed with the prevention pawls 85*a* and 85*b*. Therefore, the prevention pawls 85*a* and 85*b* are prevented from disengaging from a card 2 in a state that the prevention pawls 85*a* and 85*b* are contacted with the card 2 for preventing its drawing. Further, in this embodiment, the rotation shaft 24 is disposed between the upper end of the motor 14 and the lower end of the motor 14 in the upper and lower direction and thus the size in the upper and lower direction of the card lock mechanism 7 is reduced.

In this embodiment, the gears 22 and 23 are disposed on a left side relative to the helical gear 19 and the gear 25 and the lock member 15 are disposed on a right side relative to the helical gear 19. Further, in this embodiment, the output shaft 14*a* of the motor 14, the rotation shaft 21, the rotation shaft 24 and the fixed shaft 36 are disposed from a rear side toward a front side in this order in the front and rear direction. In other words, in this embodiment, structural components of the card lock mechanism 57 are disposed with the motor 14 as a center in the right and left direction, and the structural components of the card lock mechanism 57 are arranged in the front and rear direction. Therefore, according to this embodiment, the size of the card lock mechanism 57 can be reduced in the right and left direction.

In this embodiment, the lock member 15 and the power transmission mechanism 16 are disposed between the side face part 68*a* and the side face part 69*a* formed in flat plate shapes in the right and left direction. Therefore, according to this embodiment, the lock member 15 and the power transmission mechanism 16 are disposed on the side face part 68*a* with the side face part 68*a* as a reference and then, the side face part 69*a* is attached and, in this manner, the card lock mechanism 57 can be assembled. Accordingly, in this embodiment, the card lock mechanism 57 can be assembled easily.

In this embodiment, the engaging groove 69*d* in a slit shape whose longitudinal direction is the upper and lower direction is formed in the left side face of the support frame 67, and the main body frame 56 is formed with the engaging wall part 56*a* which is disposed so that its thickness direction and the front and rear direction are coincided with each other. Further, in this embodiment, the engaging groove 69*d* is engaged with the engaging wall part 56*a*. Therefore, according to this embodiment, when a card 2 in a state that the prevention pawls 85*a* and 85*b* are contacted and its drawing is prevented is drawn from the card insertion port 3 by a criminal, the card lock mechanism 57 is prevented from disengaging from the main body frame 56 by the engaging groove 69*d* and the engaging wall part 56*a*.

[Other Embodiments]

Although the present invention has been shown and described with reference to a specific embodiment, various changes and modifications will be apparent to those skilled in the art from the teachings herein.

In the embodiment described above, the power transmission mechanism 16 includes the spur gears 23 and 25, and the spur gear 25 is engaged with the sector gear 35*b* or 85*c* of the lock member 15. However, the power transmission mechanism 16 may be structured so that the spur gear 22 is engaged with the sector gear 35*b* or 85*c*. In this case, the spur gear 22 is a final gear. Further, in the embodiment described above, the power transmission mechanism 16 includes the spur gears 22, 23 and 25. However, the power transmission mechanism 16 may include a helical gear instead of the spur gears 22, 23 and 25. In this case, the sector gears 35*b* and 85*c* are formed so as to engage with the helical gear. Further, in the embodiment described above, the lock member 15 is turnably held by the fixed shaft 36. However, the lock member 15 may be fixed to a turnable shaft which is turnably held by the support frame 17.

In the second embodiment, the motor 14 is disposed so that an axial direction of the output shaft 14*a* and the upper and lower direction are parallel to each other and, in the front and rear direction, the output shaft 14*a*, the rotation shaft 21, the rotation shaft 24 and the fixed shaft 36 are disposed from a rear side toward a front side in this order. However, the present invention is not limited to this embodiment. For example, in the second embodiment, the motor 14 is disposed so that an axial direction of the output shaft 14*a* and the front and rear direction are parallel to each other and, in the upper and lower direction, the output shaft 14*a*, the rotation shaft 21, the rotation shaft 24 and the fixed shaft 36 may be disposed from an upper side toward a lower side in this order. Also in this case, the lock plate 85 is formed so that the prevention pawls 85*a* and 85*b* are contacted with a card 2 from an upper side. Further, in the second embodiment, the lock member 15 and the power transmission mechanism 16 are disposed between the side face part 68*a* and the side face part 69*a* in the right and left direction. However, some of structural components of the power transmission mechanism 16 or the lock member 15 may be disposed on a right side of the side face part 68*a* or a left side of the side face part 69*a*.

In the first embodiment, the card lock mechanism 7 is mounted on a card reader 1 in which a card 2 is processed so that a short-side direction of the card 2 and the "X" direction are coincided with each other, and in the second embodiment, the card lock mechanism 57 is mounted on a card reader 51 in which a card 2 is processed so that a longitudinal direction of the card 2 and the "X" direction are coincided with each other. However, the present invention is not limited to this embodiment. For example, the card lock mechanism 57 may be mounted on a card reader in which a card 2 is processed so that a short-side direction of the card 2 and the "X" direction are coincided with each other. Further, the card lock mechanism 7 may be mounted on a card reader in which a card 2 is processed so that a longitudinal direction of the card 2 and the "X" direction are coincided with each other.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card, the card reader comprising:

a card insertion port into which the card is inserted and from which the card is ejected;

a card conveying passage where the card inserted from the card insertion port is conveyed; and
a card lock mechanism structured to prevent drawing of the card from the card insertion port when the card is abnormally stopped in the card conveying passage and the card is clogged in the card conveying passage;
wherein the card lock mechanism comprises:
a motor;
a lock member comprising a prevention pawl configured to contact with the card for preventing drawing of the card and structured to move between a contact position where the prevention pawl is contacted with the card and a retreated position where the prevention pawl is retreated from the card conveying passage by power transmitted from the motor; and
a power transmission mechanism structured to transmit power of the motor to the lock member;
wherein the power transmission mechanism comprises a final gear which is disposed on a side closest to the lock member in a transmitting direction of power from the motor to the lock member;
wherein the lock member comprises a sector gear which is engaged with the final gear; and
the prevention pawl is integrally formed with the sector gear.

2. The card reader according to claim 1, wherein
the power transmission mechanism comprises:
a worm gear comprising a screw gear fixed to an output shaft of the motor and a helical gear engaged with the screw gear;
a first rotation shaft to which the helical gear is fixed;
a first gear which is fixed to the first rotation shaft;
a second gear to which power from the first gear is transmitted;
a second rotation shaft which is disposed in parallel to the first rotation shaft and by which the second gear is relatively turnably held;
the final gear which is fixed to the second rotation shaft;
two gear side pins which are fixed to a side face of the second gear so as to protrude in an axial direction of the second rotation shaft; and
a shaft side pin which is fixed to the second rotation shaft so as to protrude to both sides in a radial direction of the second rotation shaft and to be capable of contacting with the two gear side pins,
wherein a pin clutch comprises the two gear side pins and the shaft side pin,
wherein the motor is disposed so that a thickness direction of the card conveyed along the card conveying passage and an axial direction of the output shaft are parallel to each other,
wherein the first rotation shaft and the second rotation shaft are disposed so that a width direction of the card perpendicular to a conveying direction of the card conveyed along the card conveying passage and a thickness direction of the card is parallel to axial directions of the first rotation shaft and the second rotation shaft,
wherein the card lock mechanism comprises a fixed shaft turnably holding the lock member or a turnable shaft turning together with the lock member, and
wherein the lock member is turned with the fixed shaft or the turnable shaft as a center and is moved between the contact position and the retreated position.

3. The card reader according to claim 2, wherein the second rotation shaft is disposed between one end of the motor and the other end of the motor in the thickness direction of the card.

4. The card reader according to claim 2, wherein
the first gear and the second gear are disposed on one side in the width direction of the card relative to the helical gear,
the final gear and the lock member are disposed on the other side in the width direction of the card relative to the helical gear, and
the output shaft, the first rotation shaft, the second rotation shaft and the fixed shaft or the turnable shaft are disposed in this order in the conveying direction of the card.

5. The card reader according to claim 2, wherein
when one side in the width direction of the card is referred to as a first direction and the other side in the width direction of the card is referred to as a second direction,
the helical gear is disposed on a first direction side relative to the first gear,
the gear side pins are fixed to a side face on a second direction side of the second gear so as to protrude in the second direction, and
the shaft side pin, the final gear and the lock member are disposed on a second direction side relative to the second gear.

6. The card reader according to claim 2, wherein
when one side in the thickness direction of the card is referred to as a third direction and the other side in the thickness direction of the card is referred to as a fourth direction,
the motor is disposed so that the output shaft is protruded to a third direction side, and
the prevention pawl is moved to a fourth direction side when the lock member is moved from the retreated position to the contact position.

7. The card reader according to claim 6, wherein
the first gear and the second gear are disposed on one side in the width direction of the card relative to the helical gear,
the final gear and the lock member are disposed on the other side in the width direction of the card relative to the helical gear, and
the output shaft, the first rotation shaft, the second rotation shaft, and the fixed shaft or the turnable shaft are disposed in this order in the conveying direction of the card.

8. The card reader according to claim 1, wherein
the card lock mechanism comprises:
a first side plate in a flat plate shape which structures one side face of the card lock mechanism in a width direction of the card which is perpendicular to a conveying direction of the card conveyed along the card conveying passage and a thickness direction of the card; and
a second side plate in a flat plate shape which structures the other side face of
the card lock mechanism in the width direction of the card, and
the lock member and the power transmission mechanism are disposed between the first side plate and the second side plate in the width direction of the card.

9. The card reader according to claim 8, wherein
the power transmission mechanism comprises:
a worm gear comprising a screw gear fixed to an output shaft of the motor and a helical gear engaged with the screw gear;
a first rotation shaft to which the helical gear is fixed;
a first gear which is fixed to the first rotation shaft;
a second gear to which power from the first gear is transmitted;
a second rotation shaft which is disposed in parallel to the first rotation shaft and by which the second gear is relatively turnably held;
the final gear which is fixed to the second rotation shaft;
two gear side pins which are fixed to a side face of the second gear so as to protrude in an axial direction of the second rotation shaft; and
a shaft side pin which is fixed to the second rotation shaft so as to protrude to both sides in a radial direction of the second rotation shaft and to be capable of contacting with the two gear side pins,
wherein a pin clutch comprises the two gear side pins and the shaft side pin,
wherein the motor is disposed so that the thickness direction of the card conveyed along the card conveying passage and an axial direction of the output shaft are parallel to each other,
wherein the first rotation shaft and the second rotation shaft are disposed so that the width direction of the card is parallel to axial directions of the first rotation shaft and the second rotation shaft,
wherein the card lock mechanism comprises a fixed shaft turnably holding the lock member or a turnable shaft turning together with the lock member, and
wherein the lock member is turned with the fixed shaft or the turnable shaft as a center and is moved between the contact position and the retreated position.

10. The card reader according to claim 9, wherein
the first gear and the second gear are disposed on one side in the width direction of the card relative to the helical gear,
the final gear and the lock member are disposed on the other side in the width direction of the card relative to the helical gear, and
the output shaft, the first rotation shaft, the second rotation shaft, and the fixed shaft or the turnable shaft are disposed in this order in the conveying direction of the card.

11. The card reader according to claim 10, wherein the second rotation shaft is disposed between one end of the motor and the other end of the motor in the thickness direction of the card.

12. The card reader according to claim 1, wherein the card lock mechanism comprises:
an optical sensor having a light emitting element and a light receiving element for receiving light from the light emitting element; and
an intercept member which is moved together with the lock member and intercepts light from the light emitting element to the light receiving element when the lock member is located at the retreated position.

13. The card reader according to claim 12, wherein
the power transmission mechanism comprises:
a worm gear comprising a screw gear fixed to an output shaft of the motor and a helical gear engaged with the screw gear;
a first rotation shaft to which the helical gear is fixed;
a first gear which is fixed to the first rotation shaft;
a second gear to which power from the first gear is transmitted;
a second rotation shaft which is disposed in parallel to the first rotation shaft and by which the second gear is relatively turnably held;
the final gear which is fixed to the second rotation shaft;
two gear side pins which are fixed to a side face of the second gear so as to protrude in an axial direction of the second rotation shaft; and
a shaft side pin which is fixed to the second rotation shaft so as to protrude to both sides in a radial direction of the second rotation shaft and to be capable of contacting with the two gear side pins,
wherein a pin clutch comprises the two gear side pins and the shaft side pin,
wherein the motor is disposed so that a thickness direction of the card conveyed along the card conveying passage and an axial direction of the output shaft are parallel to each other,
wherein the first rotation shaft and the second rotation shaft are disposed so that a width direction of the card perpendicular to the conveying direction of the card conveyed along the card conveying passage and the thickness direction of the card is parallel to axial directions of the first rotation shaft and the second rotation shaft,
wherein the card lock mechanism comprises a fixed shaft turnably holding the lock member or a turnable shaft turning together with the lock member, and
wherein the lock member is turned with the fixed shaft or the turnable shaft as a center and is moved between the contact position and the retreated position.

14. The card reader according to claim 13, wherein
the first gear and the second gear are disposed on one side in the width direction of the card relative to the helical gear,
the final gear and the lock member are disposed on the other side in the width direction of the card relative to the helical gear, and
the output shaft, the first rotation shaft, the second rotation shaft, and the fixed shaft or the turnable shaft are disposed in this order in the conveying direction of the card.

15. The card reader according to claim 14, wherein
the card lock mechanism comprises:
a first side plate in a flat plate shape which structures one side face of the card lock mechanism in the width direction of the card; and
a second side plate in a flat plate shape which structures the other side face of the card lock mechanism in the width direction of the card, and
the lock member and the power transmission mechanism are disposed between the first side plate and the second side plate in the width direction of the card.

16. The card reader according to claim 1, wherein
the card lock mechanism comprises a support frame to which the motor, the lock member and the power transmission mechanism are attached,
a side face of the support frame in a width direction of the card perpendicular to the conveying direction of the card conveyed along the card conveying passage and a thickness direction of the card is formed with an engaging groove in a slit shape whose longitudinal direction is the thickness direction of the card, and
a main body frame of the card reader is formed with an engaging wall part with which the engaging groove is engaged.

17. The card reader according to claim 16, wherein
the power transmission mechanism comprises:
- a worm gear comprising a screw gear fixed to an output shaft of the motor and a helical gear engaged with the screw gear;
- a first rotation shaft to which the helical gear is fixed;
- a first gear which is fixed to the first rotation shaft;
- a second gear to which power from the first gear is transmitted;
- a second rotation shaft which is disposed in parallel to the first rotation shaft and by which the second gear is relatively turnably held;
- the final gear which is fixed to the second rotation shaft;
- two gear side pins which are fixed to a side face of the second gear so as to protrude in an axial direction of the second rotation shaft; and
- a shaft side pin which is fixed to the second rotation shaft so as to protrude to both sides in a radial direction of the second rotation shaft and to be capable of contacting with the two gear side pins, wherein a pin clutch comprises the two gear side pins and the shaft side pin, wherein the motor is disposed so that the thickness direction of the card conveyed along the card conveying passage and an axial direction of the output shaft are parallel to each other, wherein the first rotation shaft and the second rotation shaft are disposed so that the width direction of the card is parallel to axial directions of the first rotation shaft and the second rotation shaft, wherein the card lock mechanism comprises a fixed shaft turnably holding the lock member or a turnable shaft turning together with the lock member, and wherein the lock member is turned with the fixed shaft or the turnable shaft as a center and is moved between the contact position and the retreated position.

18. The card reader according to claim 17, wherein
the first gear and the second gear are disposed on one side in the width direction of the card relative to the helical gear,
the final gear and the lock member are disposed on the other side in the width direction of the card relative to the helical gear, and
the output shaft, the first rotation shaft, the second rotation shaft, and the fixed shaft or the turnable shaft are disposed in this order in the conveying direction of the card.

19. The card reader according to claim 18, wherein
the card lock mechanism comprises:
- a first side plate in a flat plate shape which structures one side face of the card lock mechanism in the width direction of the card; and
- a second side plate in a flat plate shape which structures the other side face of the card lock mechanism in the width direction of the card, and the lock member and the power transmission mechanism are disposed between the first side plate and the second side plate in the width direction of the card.

20. A card lock mechanism for use in a card reader having a card insertion port into which a card is inserted and from which the card is ejected and a card conveying passage where the card inserted from the card insertion port is conveyed, and the card lock mechanism being structured to prevent drawing of the card from the card insertion port when the card is abnormally stopped in the card conveying passage and the card is clogged in the card conveying passage, the card lock mechanism comprising:
- a motor;
- a lock member which is formed with a prevention pawl configured to contact with the card for preventing drawing of the card and structured to move between a contact position where the prevention pawl is contacted with the card and a retreated position where the prevention pawl is retreated from the card conveying passage by power transmitted from the motor; and
- a power transmission mechanism structured to transmit power of the motor to the lock member;

wherein the power transmission mechanism comprises a final gear which is disposed on a side closest to the lock member in a transmitting direction of power from the motor to the lock member;

wherein the lock member comprises a sector gear which is engaged with the final gear; and the prevention pawl is integrally formed with the sector gear.

21. The card lock mechanism according to claim 20, wherein
the power transmission mechanism comprises:
- a worm gear comprising a screw gear fixed to an output shaft of the motor and a helical gear engaged with the screw gear;
- a first rotation shaft to which the helical gear is fixed;
- a first gear which is fixed to the first rotation shaft;
- a second gear to which power from the first gear is transmitted;
- a second rotation shaft which is disposed in parallel to the first rotation shaft and by which the second gear is relatively turnably held;
- the final gear which is fixed to the second rotation shaft;
- two gear side pins which are fixed to a side face of the second gear so as to protrude in an axial direction of the second rotation shaft; and
- a shaft side pin which is fixed to the second rotation shaft so as to protrude to both sides in a radial direction of the second rotation shaft and to be capable of contacting with the two gear side pins, wherein a pin clutch comprises the two gear side pins and the shaft side pin, wherein the motor is disposed so that a thickness direction of the card in the card conveying passage and an axial direction of the output shaft are parallel to each other, wherein the first rotation shaft and the second rotation shaft are disposed so that a width direction of the card perpendicular to the thickness direction of the card in the card conveying passage is parallel to axial directions of the first rotation shaft and the second rotation shaft, wherein the card lock mechanism comprises a fixed shaft turnably holding the lock member or a turnable shaft turning together with the lock member, and wherein the lock member is turned with the fixed shaft or the turnable shaft as a center and is moved between the contact position and the retreated position.

\* \* \* \* \*